(12) United States Patent
Lee et al.

(10) Patent No.: US 8,521,083 B2
(45) Date of Patent: Aug. 27, 2013

(54) TIME SYNCHRONIZATION SYSTEM VIA TWO-WAY INTERACTIVE WIRELESS COMMUNICATION

(75) Inventors: Young Seok Lee, Uijeongbu-si (KR); Kwang Sung Jeung, Seoul (KR)

(73) Assignee: Hook and Time Co., Ltd., Seoul (KR)

( * ) Notice: Subject to any disclaimer, the term of this patent is extended or adjusted under 35 U.S.C. 154(b) by 433 days.

(21) Appl. No.: 12/978,541

(22) Filed: Dec. 24, 2010

(65) Prior Publication Data

US 2011/0228885 A1   Sep. 22, 2011

(30) Foreign Application Priority Data

Mar. 18, 2010   (KR) ........................ 10-2010-0024353

(51) Int. Cl.
*H04Q 7/20*   (2006.01)

(52) U.S. Cl.
USPC .......... 455/12.1; 455/502; 455/503; 455/507; 455/515; 455/500; 370/310; 370/345; 370/350; 370/503; 370/507; 342/357.2; 342/357.22; 342/357.39

(58) Field of Classification Search
USPC ................ 455/12.1, 502, 503, 507, 515, 500, 455/517, 414.1–414.4, 403, 550.1, 7, 11.1, 426.1, 426.2; 370/310, 345, 350, 503, 507, 370/328, 329; 342/357.2, 357.22, 357.39

See application file for complete search history.

(56) References Cited

U.S. PATENT DOCUMENTS

| | | | | |
|---|---|---|---|---|
| 5,257,404 A | * | 10/1993 | Goreham et al. | 455/503 |
| 2003/0122711 A1 | * | 7/2003 | Panasik et al. | 342/387 |
| 2011/0222561 A1 | * | 9/2011 | Alley et al. | 370/503 |

* cited by examiner

*Primary Examiner* — Keith Ferguson
(74) *Attorney, Agent, or Firm* — Jefferson IP Law, LLP

(57) ABSTRACT

The time synchronization system according to the present invention can allow the master and slave time Tx/Rx devices to communicate information therebetween via two-way interactive wireless communication, so that it can rapidly detect an error that occurs in the system, via a monitoring device and a network management device for performing real-time integral management. Therefore, the system can reduce the user's system maintenance fee and can also maximize efficiency. In addition, the time synchronization system can allow for the easy extension of the equipment construction coverage area even in a long distance environment, by installing only repeaters, and can manage log information that may be used as evidence data for various incidents.

10 Claims, 4 Drawing Sheets

TIME SYNCHRONIZATION SYSTEM VIA TWO-WAY INTERACTIVE WIRELESS COMMUNICATION

BACKGROUND OF THE INVENTION

1. Field of the Invention

This invention relates to time synchronization technology, and more particularly, to a time synchronization system via two-way interactive wireless communication.

2. Description of the Related Art

Time synchronization systems refer to systems that can provide precise time data to clocks, servers, equipment, other time-related systems, etc. Time synchronization systems have been used in a variety of areas, such as buildings or offices where time needs to be collectively controlled, schools where students and staff need to be aware of beginning and end times for classes, hospitals where medical devices must be operated according to precise time schedules, etc.

Conventional time synchronization systems have been operated in a wired mode. While there are some of the systems employing a wireless mode, they are implemented in such a manner to use one-way interactive wireless technology, so that they can only transmit data in one-way direction. This makes it difficult to process a system malfunction and to smoothly manage time. For example, when conventional time synchronization systems do not receive Global Positioning System (GPS) signals from a satellite, due to an environmental reason, or the time transmitters do not transmit time data, or the time receivers malfunction, there is no way to detect the problem that occurred. Therefore, in conventional art, time must be corrected as each system compensates time information by itself. However, when an accumulation error occurs after correcting the time, the corrected time decreases the precision and reliability of the system.

In addition, when an error occurs in the time synchronization system, there is no way to detect whether it occurred until the user directly checks it. This delays the restore of the system to a normal state from a malfunctioned state, and it is thus impossible for the system to provide precise time. In particular, although the system may not be operated due to a simple error, such as a problem where power is not supplied, it is disadvantageous in that even such an error cannot be simply processed for rapid restoration.

SUMMARY OF THE INVENTION

The invention has been made in view of the above problems, and provides a time synchronization system that includes a monitoring device and a network management device for performing real-time integral management and allows the master time transmission-reception device (master time Tx/Rx device) and slave time transmission-reception device (slave time Tx/Rx device) to communicate information therebetween via two-way interactive wireless communication, so that it can rapidly detect an error that occurs in the system, then reduce the user's system maintenance fee, and thus maximize efficiency.

The invention further provides a time synchronization system that can allow for the easy extension of the equipment construction coverage area even in a long distance environment, by installing only repeaters, and can manage log information that may be used as evidence data for various incidents.

In accordance with an exemplary embodiment of the invention, the invention provides a time synchronization system comprising: a master time Tx/Rx device for receiving global standard time data from a satellite; at least one or more slave time Tx/Rx devices for receiving time information and operation control information from the master time Tx/Rx device, displaying the time information, and transmitting time information and state information to the master time Tx/Rx device; a network management device for managing, in real-time, the master time Tx/Rx device and the slave time Tx/Rx devices. The master time Tx/Rx device and the slave time Tx/Rx devices communicate information with each other via two-way interactive wireless communication.

Preferably, the time synchronization system may further include a monitoring device for monitoring, in real-time, the operation states of the network management device, and allowing, when an error occurs in the time synchronization system, for the repair of the error in real-time via two-way interactive wireless communication.

Preferably, the master time Tx/Rx device includes: a Global Positioning System (GPS) receiver antenna for receiving a signal from the satellite; a digital circuitry for creating time information from the received signal; an RF transmitter for wirelessly transmitting the created time information and operation control information to the slave time Tx/Rx device; an RF receiver for wirelessly receiving time information and state information transmitted from the slave time Tx/Rx device; a display unit for displaying information including a transmission-reception channel and a current state; and a key pad for allowing a user to input information for setting a slave time Tx/Rx device and the transmission-reception channel.

Preferably, the digital circuitry includes: a main clock for detecting time information from the signal received via the GPS receiver antenna; a sub clock for creating time information when an error occurs in the main clock, the sub clock being a Real Time Clock (RTC); and an automatic switching unit for automatically switching the main clock to the sub clock if the main clock malfunctions, and then automatically returning the sub clock to the main clock when it is restored.

Preferably, the slave time Tx/Rx device includes: a display unit for displaying time information; an RF receiver for receiving time information and operation control information from the master time Tx/Rx device and automatically setting time based on the received time information; and an RF transmitter for transmitting time information and state information of a corresponding to slave time Tx/Rx device to the master time Tx/Rx device.

Preferably, the time synchronization system may further include a repeater for receiving signals from the master time Tx/Rx device and the slave time Tx/Rx device and re-transmitting them to opposite sides, so that the signals can cover a longer distance.

Preferably, the slave time Tx/Rx device compensates time by comparing its own time information with the time information transmitted from the master time Tx/Rx device.

Preferably, the slave time Tx/Rx device immediately transmits, when the time difference according to the comparison is equal to or greater than a preset value, state information reporting an error occurrence to the master time Tx/Rx device.

Preferably, the master time Tx/Rx device further includes a DIU for provides precise time information to an external system, wherein the DIU serves as a time providing server.

Preferably, the network management device manages two or more sub systems, where each sub system comprises a master time Tx/Rx device and at least one or more slave time Tx/Rx devices.

Preferably, the monitoring device includes a maintenance server for maintaining and repairing the time synchronization system via two-way interactive wireless communication. The monitoring device monitors, in real-time, operation states of the master time Tx/Rx device and the network management devices.

BRIEF DESCRIPTION OF THE DRAWINGS

The features and advantages of the invention will become more apparent from the following detailed description in conjunction with the accompanying drawings, in which.

DETAILED DESCRIPTION OF EXEMPLARY EMBODIMENTS

Hereinafter, exemplary embodiments of the invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the invention.

In this application, it will be understood that when an element is referred to as being "connected" or "coupled" to another element, it can be directly connected or coupled to the other element or intervening elements may be present. It will be further understood that the terms "includes," "comprises," "including" and/or "comprising," specify the presence of stated features, integers, steps, operations, elements, and/or components, but do not preclude the presence or addition of one or more other features, integers, steps, operations, elements, components, and/or groups thereof.

Figure 1:
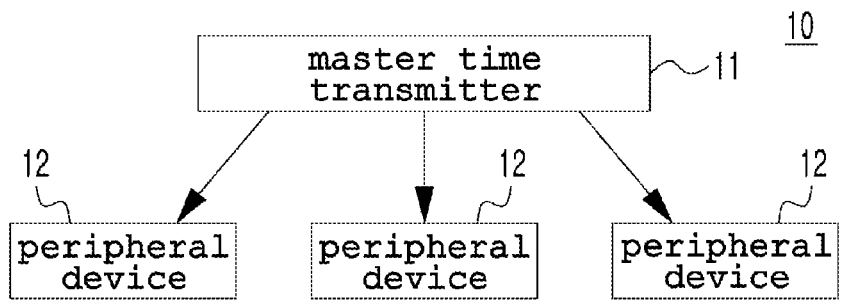
FIG. 1 illustrates a schematic block diagram of a conventional time synchronization system.

FIG. 1 illustrates a schematic block diagram of a conventional time synchronization system. As shown in FIG. 1, in the conventional time synchronization system 10, data is transmitted from the master time transmission device 11 to peripheral devices 12 in a wired communication mode or a one-way wireless communication mode. However, while the conventional time synchronization system performs data communication in a one-way interactive wireless communication mode, it cannot show whether an error has occurred until the user checks directly. That is, the conventional time synchronization system does not check whether it has an error, by any other methods than the user's direct checking. Therefore, when the conventional time synchronization system has an error it takes a long time to be restored, which makes it difficult to manage time synchronization.

Figure 2:
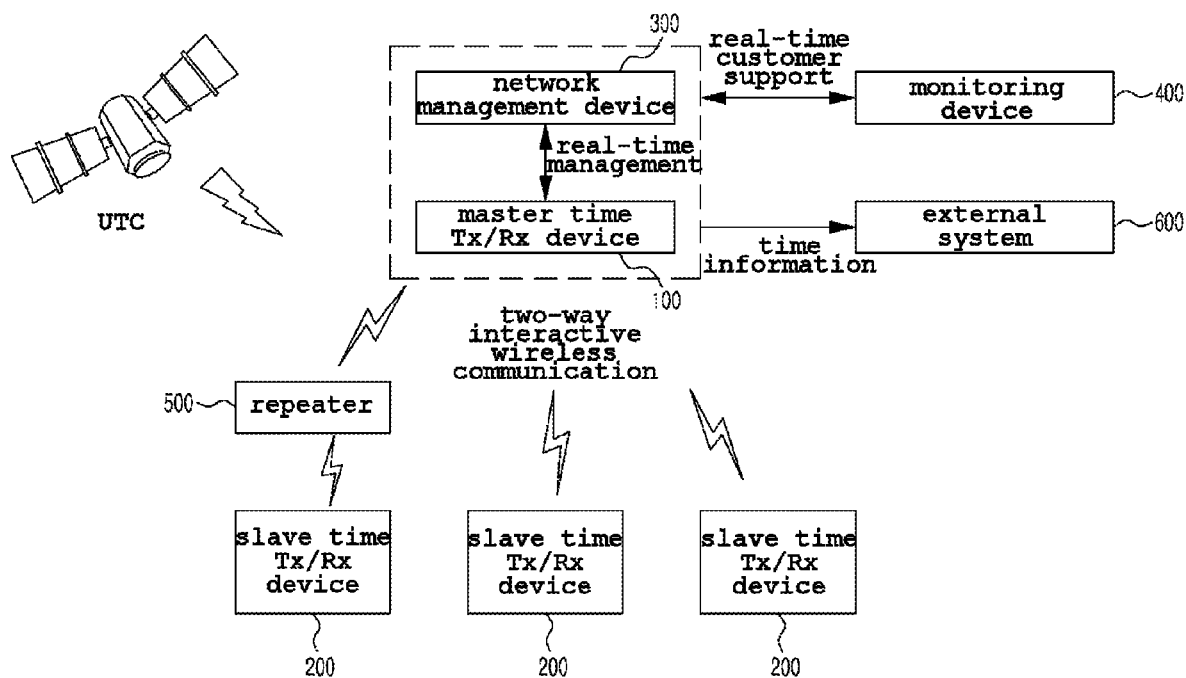
FIG. 2 illustrates a schematic block diagram of a time synchronization system via two-way interactive wireless communication according to an embodiment of the invention.

This invention is designed to resolve these problems and is shown in FIG. 2 as an embodiment thereof. FIG. 2 illustrates a schematic block diagram of a time synchronization system via two-way interactive wireless communication according to an embodiment of the invention.

As shown in FIG. 2, the time synchronization system includes a master time transmission-reception device (master time Tx/Rx device) 100, a slave time transmission-reception device (slave time Tx/Rx device) 200 and a network management device 300. The time synchronization system may further include a monitoring device 400 and a repeater 500. In the time synchronization system, the master time Tx/Rx device 100 and the slave time Tx/Rx device 200 communicate information with each other via two-way interactive wireless communication. Therefore, when an error occurs in the system, the network management device 300 can detect it, so that the system can be rapidly restored and thus efficiently manage time synchronization.

The slave time Tx/Rx device 200 can compensate time by comparing time information, transmitted from the master time Tx/Rx device 100, with its own time information. When the time difference according to the comparison is equal to or greater than a preset value, the slave time Tx/Rx device 200 immediately transmits state information reporting an error occurrence to the master time Tx/Rx device 100. When the master time Tx/Rx device 100 receives the state information from the master time Tx/Rx device 100, it immediately re-transmits new time information even before a preset time has elapsed, so that the error can be corrected, which is processed to provide precise time information.

In the following description, each element in the time synchronization system shown in FIG. 2 is described in detail.

The master time Tx/Rx device 100 receives data related to the global standard time (or Coordinated Universal Time (UTC)) from the satellite and transmits it to the slave time Tx/Rx device 200. The master time Tx/Rx device 100 also transmits its state information to the network management device 300 and operation control information to the slave time Tx/Rx device 200. In another embodiment, the system may be implemented with a number of master time Tx/Rx devices. In that case, since the master time Tx/Rx devices have unique identifications (IDs), respectively, they can be managed by only one network management device 300. When the transmission channels of the master time Tx/Rx device 100 are altered due to the changes in the environment, they can be automatically scanned, so that wireless transmission-reception communication can be smoothly performed. The elements included in the master time Tx/Rx device 100 will be described, in detail, later, referring to FIG. 3.

The slave time Tx/Rx device 200 receives time information and operation control information from the master time Tx/Rx device 100 and then displays it. The slave time Tx/Rx device 200 transmits information including state information and the displayed time information to the master time Tx/Rx device 100. In another embodiment, the time synchronization system of the invention may include at least one or more slave time Tx/Rx devices. In that case, since the slave time Tx/Rx devices have unique identifications (IDs), respectively, they can communicate data with one master time Tx/Rx device 100 without collision. The elements included in the slave time Tx/Rx device 200 will be described, in detail, later, referring to FIG. 4.

The network management device 300 manages, in real-time, the master time Tx/Rx device 100 and the slave time Tx/Rx device 200. The network management device 300 integrally manages the installed master time Tx/Rx device 100. The network management device 300 also manages the repeater 500, controlled under the master time Tx/Rx device 100, and the slave time Tx/Rx device 200. When the network management device 300 receives a malfunction signal or an error signal from the devices, it outputs an alert/alarm in real-time. The network management device 300 also retains received information in a database to manage information history, thereby providing evidence data regarding various incidents.

The monitoring device 400 monitors operation states of the network management device 300 in real-time, so that the time synchronization system can be rapidly restored from an error state. The monitoring device 400 integrally manages systems in a corresponding area in real-time. The monitoring device 400 stores real-time data, thereby allowing the user to refer to and manage the systems. In another embodiment, a system provider may be equipped with the monitoring device 400, so that the system provider can manage the user systems. In that case, although the administrator of the user systems is absent, the user systems can be monitored in real-time. Therefore, when a system error occurs, a rapid response and restoration can be performed. In addition, since the time synchronization system can be equipped with a maintenance server, it can be stably operated and this reduces costs and maintenance time.

The repeater 500 receives signals from the master time Tx/Rx device 100 and the slave time Tx/Rx device 200 and re-transmits them to the opposite sides, so that the signals can cover longer distance. The repeater 500 is implemented with a wireless chip, so that it can receive and transmit data in a wireless mode. The repeater 500 may be allocated with an identification (ID) so it can smoothly perform wireless communication between the master time Tx/Rx device 100 and the slave time Tx/Rx device 200. In particular, the time synchronization system of the invention may include at least one or more repeaters between one master time Tx/Rx device 100 and one slave time Tx/Rx device 200.

Figure 3:
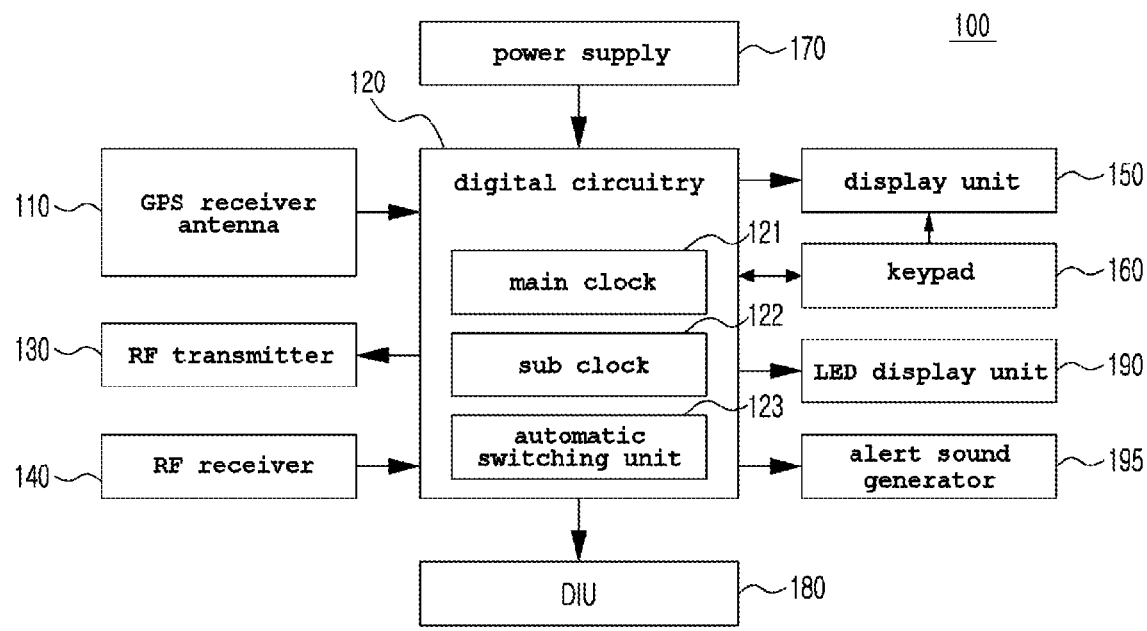
FIG. 3 illustrates a detailed schematic block diagram of a master time transmission-reception device (master time Tx/Rx device) in a time synchronization system via two-way interactive wireless communication, according to an embodiment of the invention.

FIG. 3 illustrates a detailed schematic block diagram of a master time Tx/Rx device 100 in a time synchronization system via two-way interactive wireless communication, according to an embodiment of the invention.

As shown in FIG. 3, the master time Tx/Rx device 100 includes a Global Positioning System (GPS) receiver antenna 110, a digital circuitry 120, an RF transmitter 130, an RF receiver 140, a display unit 150, a key pad 160, and a power supply 170. The master time Tx/Rx device 100 may further include a DIU 180, an LED display unit 190, and an alert sound generator 195.

The GPS receiver antenna 110 receives a signal from a satellite. Since antennas for receiving GPS signals are well known and used in a variety of areas, their detailed descriptions are omitted in this application.

The digital circuitry 120 creates time information from the received signal. As shown in FIG. 3, the digital circuitry 120 includes a main clock 121, a sub clock 122 and an automatic switching unit 123. The main clock 121 detects time information from the signal received via the GPS receiver antenna 110. The sub clock 122 is implemented with a Real Time Clock (RTC). The automatic switching unit 123 serves to automatically switch the main clock 121 to the sub clock 122 if the main clock 121 malfunctions, and then automatically returns the sub clock 122 to the main clock 121 when it is restored. The automatic switching function between the main clock 121 and the sub clock 122 allows the sub clock 122, in particular, when the main clock 121 malfunctions, to transmit the time information to the slave time Tx/Rx device 200, thereby increasing the stability in the time synchronization system and continuing to provide time information.

The RF transmitter 130 wirelessly transmits the received time information and operation control information to the slave time Tx/Rx device 200. In another embodiment, when the time synchronization system includes the repeater 500, the RF transmitter 130 transmits the time information and operation control information to the repeater 500. Transmission of time information and operation control information may be performed regularly in a preset period of time. Alternatively, operation control information may be transmitted as state information is requested.

The RF receiver 140 wirelessly receives time information and state information transmitted from the slave time Tx/Rx device 200. In another embodiment, when the time synchronization system includes the repeater 500, the RF receiver 140 receives the time information and state information from the repeater 500. The user may set the receiving number of state information to less than 100 a day.

The display unit 150 displays a current state, a transmission/reception channel, time settings, a reception mode, ID and IP settings, channel settings, information about user management, etc. The display unit 150 may be implemented with an LCD. For example, the current state includes GPS/RTC, the rate of reception from a satellite, current time and date, the number of slave time Tx/Rx device 200, the number of repeater 500, etc.

The key pad 160 allows a user to input information for setting a slave time Tx/Rx device 200, which will receive time signal, and the transmission-reception channel.

The power supply 170 supplies power to the master time Tx/Rx device 100. The power supply 170 is implemented with an AC-DC power adapter or a battery.

The DIU 180, serving as a time providing server, provides precise time information to an external system 600 such as external servers or equipment. The DIU 180 provides synchronized time information to the external system 600 via the input-output ports, thereby increasing the efficiency.

The LED display unit 190 displays the states of the system. To this end, the LED display unit 190 includes a power display light, an alarm display light, a GPS signal reception state display light, etc. The power display light is turned on when the electric power is supplied to the system. The power display light can display different colors according to the types of supplied electric power. The alarm display light is turned on when an alarm/alert is created, when electric power is switched off, no GPS signal is received, wireless transmission-reception fails, no reply is received from other devices, etc. The GPS signal reception state display light may be designed to turn itself on when GPS signals are normally received.

The alert sound generator 195 generates an alert sound when an alarm occurs, thereby rapidly coping with a corresponding situation. The alert sound generator 195 may also be implemented in such away that sounds can be generated when keys are operated in the keypad 160.

Figure 4:
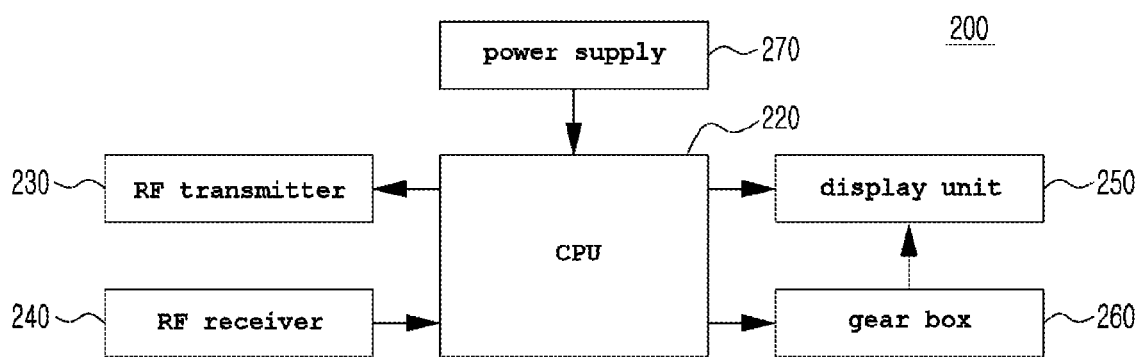
FIG. 4 illustrates a detailed schematic block diagram of a slave time transmission-reception device (slave time Tx/Rx device) in a time synchronization system via two-way interactive wireless communication, according to an embodiment of the invention.

FIG. 4 illustrates a detailed schematic block diagram of a slave time Tx/Rx device in a time synchronization system via two-way interactive wireless communication, according to an embodiment of the invention.

As shown in FIG. 4, the slave time Tx/Rx device 200 includes an RF transmitter 230, an RF receiver 240, a display unit 250, and a power supply 270. The slave time Tx/Rx device 200 may further include a gear box 260. The slave time Tx/Rx device 200 may also include a Central Processing Unit (CPU) for controlling the entire elements therein.

The RF receiver 240 receives time information from the master time Tx/Rx device 100 and automatically sets the time based on the received time information. The RF receiver 240 periodically receives time information and operation control information from the master time Tx/Rx device 100 and compensates time by comparing its RTC with the received time information. When the RF receiver 240 does not receive time information from the master time Tx/Rx device 100, it displays the RTC.

The RF transmitter 230 transmits the time information and state information of a corresponding slave time Tx/Rx device 200 to the master time Tx/Rx device 100. The state information may include the unique identification (ID) of a corresponding slave time Tx/Rx device 200 and a state as to whether it malfunctions. When the slave time Tx/Rx device 200 receives operation control information via which the master time Tx/Rx device 100 requests to receive the state information, the RF transmitter 230 transmits the state information of the slave time Tx/Rx device 200 to the master time Tx/Rx device 100.

The display unit 250 displays time information. The display unit 250 may be implemented with an analog or digital clock.

The power supply 270 is the same that as the master time Tx/Rx device 100. Therefore, its detailed description is omitted.

The gear box 260 serves to adjust time in a clock. The gearbox 260 receives the time information and time compensation information from the RF receiver 240 and sets and compensates time to be displayed on the display unit 250.

Figure 5:
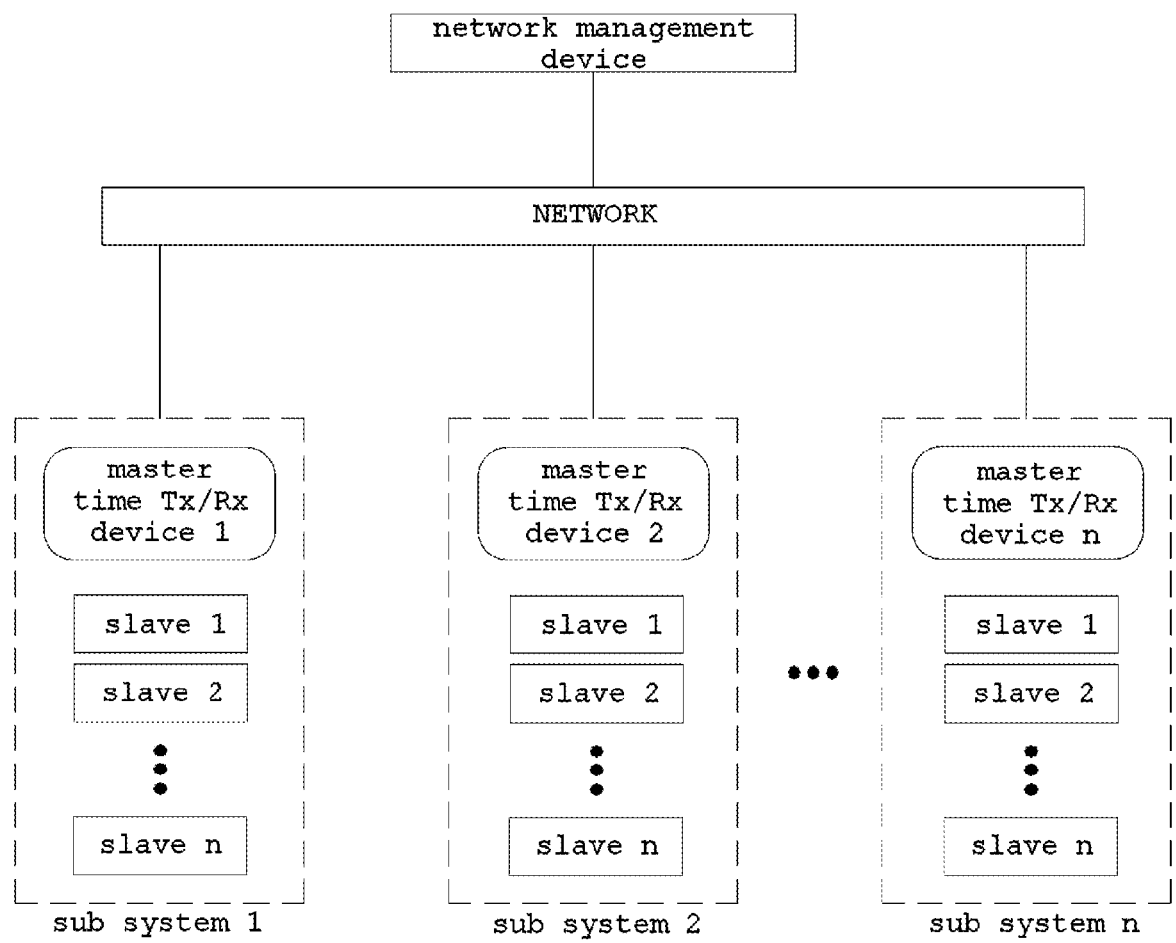
FIG. 5 illustrates a schematic block diagram of a time synchronization system via two-way interactive wireless communication that describes multi-management, according to an embodiment of the invention.

FIG. 5 illustrates a schematic block diagram of a time synchronization system via two-way interactive wireless communication that describes multi-management, according to an embodiment of the invention.

As shown in FIG. 5, in order to perform multi-management, the time synchronization system is configured in such a way that the network management device manages two or more sub systems 1, 2, . . . , i, where each sub system includes a master time Tx/Rx device i and at least one or more slave time Tx/Rx devices $1_i, 2_i, \ldots, n_i$. Since the master time Tx/Rx devices i have unique IDs, respectively, they do cause a conflict with other elements during the multi-management, thereby smoothly managing time synchronization.

Figure 6:
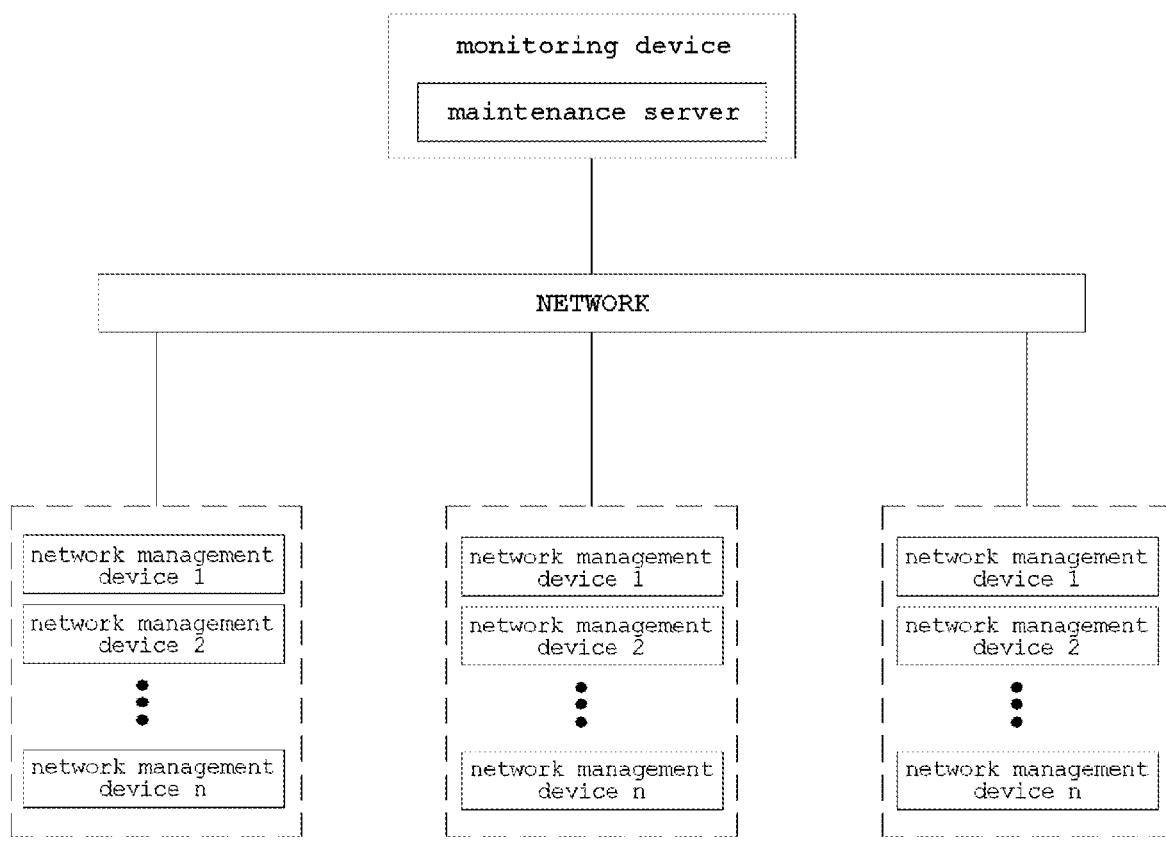
FIG. 6 illustrates a schematic block diagram of a time synchronization system via two-way interactive wireless communication that provides an information management service via the monitoring device.

FIG. 6 illustrates a schematic block diagram of a time synchronization system via two-way interactive wireless communication that provides an information management service via the monitoring device.

As shown in FIG. 6, in order to provide an information management service, the monitoring device includes a maintenance server for maintaining the user system and repairing errors. The monitoring device can monitor, in real time, operation states of the master time Tx/Rx device and the network management devices, based on the Internet. Therefore, when an error or a malfunction occurs in the time synchronization system, the monitoring device can cope with the error or malfunction reason in real-time, thereby increasing the stability of the systems.

As described above, the time synchronization system according to the invention can allow the master and slave time Tx/Rx devices to communicate information therebetween via two-way interactive wireless communication, so that it can rapidly detect an error that occurs in the system, via a monitoring device and a network management device for performing real-time integral management. Therefore, the system can reduce the user's system maintenance fee and can also maximize efficiency.

In addition, the time synchronization system can allow for the easy extension of the equipment construction coverage area even in a long distance environment, by installing only repeaters, and can manage log information that may be used as evidence data for various incidents.

Although exemplary embodiments of the invention have been described in detail hereinabove, it should be understood that many variations and modifications of the basic inventive concept herein described, which may be apparent to those skilled in the art, will still fall within the spirit and scope of the exemplary embodiments of the invention as defined in the appended claims.

What is claimed is:

1. A time synchronization system comprising:
   a master time transmission-reception device (master time Tx/Rx device) for receiving global standard time data from a satellite;
   at least one or more slave time transmission-reception devices (slave time Tx/Rx devices) for receiving time information and operation control information from the master time Tx/Rx device, displaying the time information, and transmitting time information and state information to the master time Tx/Rx device;
   a network management device for managing, in real-time, the master time Tx/Rx device and the slave time Tx/Rx devices; and
   a monitoring device for monitoring, in real-time, the operation states of the network management device, and allowing, when an error occurs in the time synchronization system, for the repair of the error in real-time via two-way interactive wireless communication,
   wherein the master time Tx/Rx device and the slave time Tx/Rx devices communicate information with each other via two-way interactive wireless communication.

2. The system of claim 1, wherein the master time Tx/Rx device comprises:
   a Global Positioning System (GPS) receiver antenna for receiving a signal from the satellite;
   a digital circuitry for creating time information from the received signal;
   an RF transmitter for wirelessly transmitting the created time information and operation control information to the slave time Tx/Rx device;
   an RF receiver for wirelessly receiving time information and state information transmitted from the slave time Tx/Rx device;
   a display unit for displaying information including a transmission-reception channel and a current state; and
   a key pad for allowing a user to input information for setting a slave time Tx/Rx device and the transmission-reception channel.

3. The system of claim 2, wherein the digital circuitry comprises:
   a main clock for detecting time information from the signal received via the GPS receiver antenna;
   a sub clock for creating time information when an error occurs in the main clock, the sub clock being a Real Time Clock (RTC); and
   an automatic switching unit for automatically switching the main clock to the sub clock if the main clock malfunctions, and then automatically returning the sub clock to the main clock when it is restored.

4. The system of claim 1, wherein the slave time Tx/Rx device comprises:
   a display unit for displaying time information;
   an RF receiver for receiving time information and operation control information from the master time Tx/Rx device and automatically setting time based on the received time information; and an RF transmitter for transmitting time information and state information of a corresponding to slave time Tx/Rx device to the master time Tx/Rx device.

5. The system of claim 1, further comprising:

a repeater for receiving signals from the master time Tx/Rx device and the slave time Tx/Rx device and re-transmitting them to opposite sides, so that the signals can cover a longer distance.

6. The system of claim 1, wherein the slave time Tx/Rx device compensates time by comparing its own time information with the time information transmitted from the master time Tx/Rx device.

7. The system of claim 6, wherein the slave time Tx/Rx device immediately transmits, when the time difference according to the comparison is equal to or greater than a preset value, state information reporting an error occurrence to the master time Tx/Rx device.

8. The system of claim 1, wherein the master time Tx/Rx device further comprises:

a DIU for provides precise time information to an external system, wherein the DIU serves as a time providing server.

9. The system of claim 1, wherein the network management device manages two or more sub systems, where each sub system comprises a master time Tx/Rx device and at least one or more slave time Tx/Rx devices.

10. The system of claim 1, wherein the monitoring device comprises:

a maintenance server for maintaining and repairing the time synchronization system via two-way interactive wireless communication, where the monitoring device monitors, in real-time, operation states of the master time Tx/Rx device and the network management devices.

* * * * *